United States Patent [19]
Miyashita et al.

[11] Patent Number: 5,754,696
[45] Date of Patent: May 19, 1998

[54] APPARATUS FOR COMPRESSION-CODING IMAGE DATA AND METHOD OF THE SAME BASED ON QUANTIFICATION AND FREQUENCY TRANSFORM COEFFICIENT AMPLITUDE REDUCTION

[75] Inventors: Mitsuhiro Miyashita, Nishinomiya; Tatsushi Bannai, Sakai, both of Japan

[73] Assignee: Matsushita Electric Industrial Co., Ltd., Kadoma, Japan

[21] Appl. No.: 356,883

[22] Filed: Dec. 15, 1994

[30] Foreign Application Priority Data

Dec. 16, 1993 [JP] Japan ................... 5-316357

[51] Int. Cl.⁶ .......................... G06K 9/36; G06K 9/46; H04N 7/12; H04N 1/41
[52] U.S. Cl. .................. 382/232; 382/246; 382/248; 382/251; 348/405; 348/417; 348/422; 358/427; 358/432
[58] Field of Search ................... 382/251, 248, 382/250, 232, 246; 358/432, 427, 433; 348/405, 414, 417, 418, 422

[56] References Cited

U.S. PATENT DOCUMENTS

| | | | |
|---|---|---|---|
| 5,021,891 | 6/1991 | Lee | 358/432 |
| 5,036,391 | 7/1991 | Auvray et al. | 358/133 |
| 5,067,015 | 11/1991 | Combridge et al. | 358/133 |
| 5,107,345 | 4/1992 | Lee | 358/432 |
| 5,184,229 | 2/1993 | Saito et al. | 358/427 |
| 5,216,503 | 6/1993 | Paik et al. | 358/133 |
| 5,227,878 | 7/1993 | Puri et al. | 358/136 |
| 5,253,078 | 10/1993 | Balkanski et al. | 358/426 |
| 5,274,443 | 12/1993 | Dachiku et al. | 358/136 |
| 5,341,318 | 8/1994 | Balkanski et al. | 358/427 |
| 5,452,104 | 9/1995 | Lee | 358/433 |
| 5,479,527 | 12/1995 | Chen | 358/427 |
| 5,588,075 | 12/1996 | Chiba et al. | 358/433 |

FOREIGN PATENT DOCUMENTS

| | | | |
|---|---|---|---|
| 0572766 | 12/1993 | European Pat. Off. | G06F 15/66 |
| 0595562 | 5/1994 | European Pat. Off. | H04N 7/137 |
| 1278185 | 11/1989 | Japan | H04N 7/132 |
| 377477 | 4/1991 | Japan | |
| 3132216 | 6/1991 | Japan | H04N 9/11 |
| 487473 | 3/1992 | Japan | |
| 549021 | 2/1993 | Japan | G06C 4/01 |

OTHER PUBLICATIONS

Search Report for European Appl. 94119818.6, mailed Feb. 6, 1996.

*Primary Examiner*—Andrew Johns
*Assistant Examiner*—Monica S. Davis
*Attorney, Agent, or Firm*—Renner, Otto, Boisselle & Sklar, P.L.L.

[57] ABSTRACT

An image compression-coding device includes a level conversion circuit for adaptively reducing the amplitude of the quantification coefficient data based on statistical characteristics of the quantification coefficient data. The device further includes a selection circuit for selectively outputting either the quantification coefficient data after the level conversion or the quantification coefficient data before the level conversion, so that the image compression-coding device outputs a smaller amount of variable-length codes.

16 Claims, 10 Drawing Sheets

FIG.2

| | | | | | | | |
|---|---|---|---|---|---|---|---|
| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG.3

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 4

| DC | 171 | 40 | −19 | −3 | 3 | 5 | −3 |
|---|---|---|---|---|---|---|---|
| 140 | 24 | −20 | −20 | 1 | −2 | 2 | −4 |
| −47 | −15 | −35 | 4 | 18 | 0 | −5 | 1 |
| 108 | −76 | 11 | 16 | 1 | −4 | −6 | 5 |
| 34 | −5 | 2 | 9 | −11 | −2 | 0 | 3 |
| −12 | −39 | 4 | 13 | −9 | 4 | 6 | 1 |
| 1 | −39 | 14 | 5 | −6 | 8 | 2 | −2 |
| −7 | −12 | 23 | 4 | −5 | −1 | −1 | 0 |

FIG. 5

| DC | 16 | 4 | −1 | 0 | 0 | 0 | 0 |
|---|---|---|---|---|---|---|---|
| 12 | 2 | −1 | −1 | 0 | 0 | 0 | 0 |
| −3 | −1 | −2 | 0 | 0 | 0 | 0 | 0 |
| 8 | −4 | 1 | 1 | 0 | 0 | 0 | 0 |
| 2 | 0 | 0 | 0 | 0 | 0 | 0 | 0 |
| −1 | −1 | 0 | 0 | 0 | 0 | 0 | 0 |
| 0 | −1 | 0 | 0 | 0 | 0 | 0 | 0 |
| 0 | 0 | 0 | 0 | 0 | 0 | 0 | 0 |

FIG.6

| DC | 15 | 3  | -1 | 0 | 0 | 0 | 0 |
|----|----|----|----|---|---|---|---|
| 11 | 1  | -1 | -1 | 0 | 0 | 0 | 0 |
| -2 | -1 | -1 | 0  | 0 | 0 | 0 | 0 |
| 7  | -3 | 1  | 1  | 0 | 0 | 0 | 0 |
| 1  | 0  | 0  | 0  | 0 | 0 | 0 | 0 |
| -1 | -1 | 0  | 0  | 0 | 0 | 0 | 0 |
| 0  | -1 | 0  | 0  | 0 | 0 | 0 | 0 |
| 0  | 0  | 0  | 0  | 0 | 0 | 0 | 0 |

FIG.7

| DC | 15 | 3  | -1 | 0 | 0 | 0 | 0 |
|----|----|----|----|---|---|---|---|
| 12 | 1  | -1 | -1 | 0 | 0 | 0 | 0 |
| -3 | -1 | -1 | 0  | 0 | 0 | 0 | 0 |
| 7  | -3 | 1  | 1  | 0 | 0 | 0 | 0 |
| 1  | 0  | 0  | 0  | 0 | 0 | 0 | 0 |
| -1 | -1 | 0  | 0  | 0 | 0 | 0 | 0 |
| 0  | -1 | 0  | 0  | 0 | 0 | 0 | 0 |
| 0  | 0  | 0  | 0  | 0 | 0 | 0 | 0 |

FIG.8

| 16 | 9.68 | 8.80 | 14.08 | 21.12 | 35.20 | 44.88 | 53.68 |
|---|---|---|---|---|---|---|---|
| 10.56 | 10.56 | 12.32 | 16.72 | 22.88 | 51.04 | 52.80 | 48.40 |
| 12.32 | 11.44 | 14.08 | 21.12 | 35.20 | 50.16 | 60.72 | 49.28 |
| 12.32 | 14.96 | 19.36 | 25.52 | 44.88 | 76.56 | 70.40 | 54.56 |
| 15.84 | 19.36 | 32.56 | 49.28 | 59.84 | 95.92 | 90.64 | 67.76 |
| 21.12 | 30.80 | 48.40 | 56.32 | 71.28 | 91.52 | 99.44 | 80.96 |
| 43.12 | 56.32 | 68.64 | 76.56 | 90.64 | 106.48 | 105.60 | 88.88 |
| 63.36 | 80.96 | 83.60 | 86.24 | 98.56 | 88.00 | 90.64 | 87.12 |

*FIG.11*

| DC | 15 | 4 | −1 | 0 | 0 | 0 | 0 |
|---|---|---|---|---|---|---|---|
| 11 | 1 | −1 | −1 | 0 | 0 | 0 | 0 |
| −3 | −1 | −2 | 0 | 0 | 0 | 0 | 0 |
| 7 | −4 | 0 | 0 | 0 | 0 | 0 | 0 |
| 2 | 0 | 0 | 0 | 0 | 0 | 0 | 0 |
| 0 | −1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

APPARATUS FOR COMPRESSION-CODING IMAGE DATA AND METHOD OF THE SAME BASED ON QUANTIFICATION AND FREQUENCY TRANSFORM COEFFICIENT AMPLITUDE REDUCTION

BACKGROUND OF THE INVENTION

1. Field of the Invention

The present invention relates to an image compression-coding apparatus and method for compressing data of digital image signals.

2. Description of the Related Art

In a known system for efficiently compression-coding two-dimensional images, image data is first transformed using a two-dimensional discrete cosine transform, (hereinafter, referred to as "DCT") then is quantified, and is coded into a variable-length code. Such a system is used in the JPEG International Standards. Hereinafter, a conventional image compression-coding apparatus using this system will be described with reference to FIG. 12.

FIG. 12 is a block diagram illustrating a structure of a conventional image compression-coding apparatus 3. Image data is input to the image compression-coding apparatus 3 through a terminal 300. Next, the image data is divided into a plurality of 8×8 blocks by a blocking circuit 310. The plurality of 8×8 blocks are each transformed into 8×8 (=64) transform coefficients by a DCT circuit 320. The transform coefficients are arranged in a prescribed order by a zigzag scan conversion circuit 330. Then, the transform coefficients are quantified by a quantification circuit 340. The quantification of the transform coefficients is performed by dividing the transform coefficients by a corresponding quantification value which is previously stored in a quantification table 350. As a result of the quantification, quantification coefficient data is output by the quantification circuit 340. The quantification data is then coded into a variable-length code, namely, a two-dimensional Huffman code and an additional bit by a variable-length coding circuit 360. The two-dimensional Huffman codes and the additional bit are output through a terminal 370.

The two-dimensional Huffman code is determined in accordance with the combination of (1) the number of successive zero quantification coefficient data and (2) the group to which the non-zero quantification coefficient data following the successive zero quantification coefficient data belongs. The additional bit(s) is determined so as to represent the value of the non-zero quantification coefficient data in the group to which the non-zero quantification coefficient data belongs. In this specification, the length of the successive zero quantification coefficient data will be referred to as "Zero-Run". The combination of Zero-Run and the reference number of the group which the non-zero quantification coefficient data following the successive zero quantification coefficient data belongs to will be referred to as "Run-Level".

For example, the quantification data is coded into a two-dimensional Huffman code and an additional bit by the variable-length coding circuit 360 in accordance with Tables 1 and 2-1 to 2-4.

Table 1 shows the relationship among the value of non-zero quantification coefficient data, the reference number of the group to which the non-zero quantification coefficient data belongs, and the number of the additional bits corresponding to the non-zero quantification coefficient data. Tables 2-1 to 2-4 show the relationship between the Run-Level and the two-dimensional Huffman code.

TABLE 1

| Value of non-zero quantification coefficient data | Number of group | Number of additional bits |
|---|---|---|
| −1, 1 | 1 | 1 |
| −3, −2, 2, 3 | 2 | 2 |
| −7, −6, −5, −4, 4, 5, 6, 7 | 3 | 3 |
| −15, −14, . . . , −9, −8, 8, 9, . . . , 14, 15 | 4 | 4 |
| −31, −30, . . . , −17, −16, 16, 17, . . . , 30, 31 | 5 | 5 |
| −63, −62, . . . , −33, −32, 32, 33, . . . , 62, 63 | 6 | 6 |
| −127, −126, . . . , −65, −64, 64, 65, . . . , 126, 127 | 7 | 7 |
| −255, −254, . . . , −129, −128, 128, 129, . . . , 254, 255 | 8 | 8 |
| −511, −510, . . . , −257, −256, 256, 257, . . . , 510, 511 | 9 | 9 |
| −1023, −1022, . . . , −513, −512, 512, 513, . . . , 1022, 1023 | 10 | 10 |

TABLE 2-1

| Run-level | Two-dimensional Huffman code |
|---|---|
| EOB | 1010 |
| 0-1 | 00 |
| 0-2 | 01 |
| 0-3 | 100 |
| 0-4 | 1011 |
| 0-5 | 11010 |
| 0-6 | 111000 |
| 0-7 | 1111000 |
| 0-8 | 1111110110 |
| 0-9 | 1111111110000010 |
| 0-10 | 1111111110000011 |
| 1-1 | 1100 |
| 1-2 | 111001 |
| 1-3 | 1111001 |
| 1-4 | 111110110 |
| 1-5 | 11111110110 |
| 1-6 | 1111111110000100 |
| 1-7 | 1111111110000101 |
| 1-8 | 1111111110000110 |
| 1-9 | 1111111110000111 |
| 1-10 | 1111111110001000 |
| 2-1 | 11011 |
| 2-2 | 11111000 |
| 2-3 | 1111110111 |
| 2-4 | 1111111110001001 |
| 2-5 | 1111111110001010 |
| 2-6 | 1111111110001011 |
| 2-7 | 1111111110001100 |
| 2-8 | 1111111110001101 |
| 2-9 | 1111111110001110 |
| 2-10 | 1111111110001111 |
| 3-1 | 111010 |
| 3-2 | 111110111 |
| 3-3 | 11111110111 |
| 3-4 | 1111111110010000 |

TABLE 2-1-continued

| Run-level | Two-dimensional Huffman code |
|---|---|
| 3-5 | 1111111110010001 |
| 3-6 | 1111111110010010 |
| 3-7 | 1111111110010011 |
| 3-8 | 1111111110010100 |
| 3-9 | 1111111110010101 |
| 3-10 | 1111111110010110 |
| 4-1 | 111011 |
| 4-2 | 1111111000 |
| 4-3 | 1111111110010111 |
| 4-4 | 1111111110011000 |
| 4-5 | 1111111110011001 |
| 4-6 | 1111111110011010 |
| 4-7 | 1111111110011011 |
| 4-8 | 1111111110011100 |
| 4-9 | 1111111110011101 |
| 4-10 | 1111111110011110 |

TABLE 2-2

| Run-level | Two-dimensional Huffman code |
|---|---|
| 5-1 | 1111010 |
| 5-2 | 111111001 |
| 5-3 | 1111111110011111 |
| 5-4 | 1111111110100000 |
| 5-5 | 1111111110100001 |
| 5-6 | 1111111110100010 |
| 5-7 | 1111111110100011 |
| 5-8 | 1111111110100100 |
| 5-9 | 1111111110100101 |
| 5-10 | 1111111110100110 |
| 6-1 | 1111011 |
| 6-2 | 111111111000 |
| 6-3 | 1111111110100111 |
| 6-4 | 1111111110101000 |
| 6-5 | 1111111110101001 |
| 6-6 | 1111111110101010 |
| 6-7 | 1111111110101011 |
| 6-8 | 1111111110101100 |
| 6-9 | 1111111110101101 |
| 6-10 | 1111111110101110 |
| 7-1 | 11111001 |
| 7-2 | 111111001 |
| 7-3 | 1111111110101111 |
| 7-4 | 1111111110110000 |
| 7-5 | 1111111110110001 |
| 7-6 | 1111111110110010 |
| 7-7 | 1111111110110011 |
| 7-8 | 1111111110110100 |
| 7-9 | 1111111110110101 |
| 7-10 | 1111111110110110 |
| 8-1 | 11111010 |
| 8-2 | 111111111000000 |
| 8-3 | 1111111110110111 |
| 8-4 | 1111111110111000 |
| 8-5 | 1111111110111001 |
| 8-6 | 1111111110111010 |
| 8-7 | 1111111110111011 |
| 8-8 | 1111111110111100 |
| 8-9 | 1111111110111101 |
| 8-10 | 1111111110111110 |
| 9-1 | 111111000 |
| 9-2 | 1111111110111111 |
| 9-3 | 1111111111000000 |
| 9-4 | 1111111111000001 |
| 9-5 | 1111111111000010 |
| 9-6 | 1111111111000011 |
| 9-7 | 1111111111000100 |
| 9-8 | 1111111111000101 |
| 9-9 | 1111111111000110 |
| 9-10 | 1111111111000111 |

TABLE 2-3

| Run-level | Two-dimensional Huffman code |
|---|---|
| 10-1 | 111111001 |
| 10-2 | 1111111111001000 |
| 10-3 | 1111111111001001 |
| 10-4 | 1111111111001010 |
| 10-5 | 1111111111001011 |
| 10-6 | 1111111111001100 |
| 10-7 | 1111111111001101 |
| 10-8 | 1111111111001110 |
| 10-9 | 1111111111001111 |
| 10-10 | 1111111111010000 |
| 11-1 | 111111010 |
| 11-2 | 1111111111010001 |
| 11-3 | 1111111111010010 |
| 11-4 | 1111111111010011 |
| 11-5 | 1111111111010100 |
| 11-6 | 1111111111010101 |
| 11-7 | 1111111111010110 |
| 11-8 | 1111111111010111 |
| 11-9 | 1111111111011000 |
| 11-10 | 1111111111011001 |
| 12-1 | 11111110101 |
| 12-2 | 1111111111011010 |
| 12-3 | 1111111111011011 |
| 12-4 | 1111111111011100 |
| 12-5 | 1111111111011101 |
| 12-6 | 1111111111011110 |
| 12-7 | 1111111111011111 |
| 12-8 | 1111111111100000 |
| 12-9 | 1111111111100001 |
| 12-10 | 1111111111100010 |
| 13-1 | 11111111010 |
| 13-2 | 1111111111100011 |
| 13-3 | 1111111111100100 |
| 13-4 | 1111111111100101 |
| 13-5 | 1111111111100110 |
| 13-6 | 1111111111100111 |
| 13-7 | 1111111111101000 |
| 13-8 | 1111111111101001 |
| 13-9 | 1111111111101010 |
| 13-10 | 1111111111101011 |
| 14-1 | 111111110110 |
| 14-2 | 1111111111101100 |
| 14-3 | 1111111111101101 |
| 14-4 | 1111111111101110 |
| 14-5 | 1111111111101111 |
| 14-6 | 1111111111110000 |
| 14-7 | 1111111111110001 |
| 14-8 | 1111111111110010 |
| 14-9 | 1111111111110011 |
| 14-10 | 1111111111110100 |

TABLE 2-4

| Run-level | Two-dimensional Huffman code |
|---|---|
| 15-0 | 111111110111 |
| 15-1 | 1111111111110101 |
| 15-2 | 1111111111110110 |
| 15-3 | 1111111111110111 |
| 15-4 | 1111111111111000 |
| 15-5 | 1111111111111001 |
| 15-6 | 1111111111111010 |
| 15-7 | 1111111111111011 |
| 15-8 | 1111111111111100 |
| 15-9 | 1111111111111101 |
| 15-10 | 1111111111111110 |

The variable-length coding circuit 360 generates a two-dimensional Huffman code and an additional bit in accordance with Tables 1 and 2-1 to 2-4. For example, assuming that the values of three successive quantification coefficient data output by the quantification circuit 340 are 0, 0, 2, the length of the successive zero quantification coefficient data is 2. Accordingly, the Zero-Run is 2. The value of the non-zero quantification coefficient data following the successive zero quantification coefficient data is 2. Referring to the second line of Table 1, the non-zero quantification coefficient data belongs to group 2, and the number of additional bits corresponding to the non-zero quantification coefficient data is 2. Accordingly, Run-Level is "2-2". Referring to the 23th line of Table 2-1, the two-dimensional Huffman code corresponding to the Run-Level of "2-2" is "11111000". The additional bits are determined to be "10" so as to represent the value of the quantification coefficient data, namely, "2" by two bits. In this manner, the variable-length coding circuit 360 generates a two-dimensional Huffman code "11111000" and additional bits "10" in accordance with the three successive quantification coefficient data "0, 0, 2".

The Huffman code and the additional bit(s) obtained in this manner are decoded by an image data decoding apparatus. Referring to FIG. 13, an image data decoding apparatus 12 will be described.

FIG. 13 is a block diagram illustrating a structure of the image data decoding apparatus 12. The variable-length code obtained by the image is compression-coding apparatus 3 is input into the image data decoding apparatus 12 through a terminal 1200. The image data is then decoded into quantification coefficient data by a variable-length decoding circuit 1210. The quantification coefficient data is inverse-quantified into transform coefficients by an inverse quantification circuit 1220. The inverse quantification is performed by multiplying the quantification coefficient data by the quantification value corresponding to the quantification coefficient data. The quantification value is obtained from the quantification table 1270. As described above, the transform coefficients are arranged in the prescribed order before being coded. Such transform coefficients are arranged into the original order by a zigzag scan inverse conversion circuit 1230. The transform coefficients are then transformed into image data that is divided into blocks by an inverse DCT circuit 1240. Thereafter, the image data that was divided into blocks is converted back into the image data as it was when input into the terminal 300 by the blocking dissolving circuit 1250. The image data obtained by the blocking dissolving circuit 1250 is output through a terminal 1260.

In order to transmit and store the codes obtained by such a conventional image compression-coding apparatus, the amount of codes obtained by compression should be maintained so as to be less than a certain level regardless of the pattern of the image, due to the transmitting speed and the storing capacity. In the case where various image data are compression-coded into a certain amount of codes, however, coding distortion can be detected in images having a certain pattern after decoding.

SUMMARY OF THE INVENTION

The apparatus of this invention for compression-coding image data includes: a frequency transform circuit for frequency transforming the image data so as to generate a frequency transform coefficient; a quantification circuit for quantifying the frequency transform coefficient in accordance with a quantification step so as to generate quantification coefficient data; a first code length calculation circuit for calculating the length of a first variable-length code which will be obtained by coding the quantification coefficient data generated by the quantification circuit into a variable-length code in accordance with a prescribed rule; a level conversion circuit for judging whether the amplitude of the quantification coefficient data generated by the quantification circuit is reduced based on statistical characteristics of the quantification coefficient data and for reducing the amplitude of the quantification coefficient data by a predetermined number in accordance with the judging result; a second code length calculation circuit for calculating the length of a second variable-length code which will be obtained by coding the quantification coefficient data whose amplitude has been reduced by the level conversion circuit into a variable-length code in accordance with the prescribed rule; a comparison circuit for comparing the length of the first variable-length code with the length of the second variable-length code; a selection circuit for selectively outputting one of the output of the quantification circuit and the output of the level conversion circuit in accordance with the comparison result by the comparison circuit; and a coding circuit for coding the output of the selection circuit into a variable-length code in accordance with the prescribed rule.

In one embodiment of the invention, the statistical characteristics of the quantification coefficient data is related to at least one of the amplitude of the quantification coefficient data, the degree of the quantification coefficient data, and the quantification step.

In another embodiment of the invention, the level conversion circuit reduces the amplitude of the quantification coefficient data by the predetermined number, when at least one of the condition that the degree of the quantification coefficient data is smaller than a prescribed value and the condition that the amplitude of the quantification coefficient data is larger than the predetermined number is satisfied.

In another embodiment of the invention, the level conversion circuit reduces the amplitude of the quantification coefficient data by the predetermined number, when at least one of the condition that the degree of the quantification coefficient data is larger than a prescribed value and the condition that the quantification step is smaller than a prescribed value is satisfied.

Alternatively, an apparatus for compression-coding image data includes: a frequency transform circuit for frequency transforming the image data so as to generate a frequency transform coefficient; a multiplication circuit for multiplying a quantification step by a value which is greater than 0 and smaller than 0.5 so as to obtain a shift amount; a level conversion circuit for reducing the amplitude of the frequency transform coefficient by the shift amount; a quantification circuit for quantifying the frequency transform coefficient output from the level conversion circuit in accordance with the quantification step so as to generate quantification coefficient data; and a coding circuit for coding the quantification coefficient data into a variable-length code.

In one embodiment of the invention, the value is a fixed value.

In another embodiment of the invention, the value varies depending on the degree of the frequency transform coefficient.

In another embodiment of the invention, the value varies depending on the quantification step.

In another aspect of the present invention, a method for compression-coding image data includes the steps of: (a)generating quantification coefficient data based on the image data; (b)calculating the length of a first variable-length code which will be obtained by coding the quantification coefficient data generated in step (a) into a variable-length code in accordance with a prescribed rule; (c)judging whether the amplitude of the quantification coefficient data generated in step (a) is reduced based on statistical characteristics of the quantification coefficient data; (d)reducing the amplitude of the quantification coefficient data by a predetermined number in accordance with the judgement result in step (c); (e)calculating the length of a second variable-length code which will be obtained by coding the quantification coefficient data whose amplitude is reduced in step (d) into a variable-length code in accordance with the prescribed rule; (f)comparing the length of the first variable-length code with the length of the second variable-length code; (g)selecting one of the quantification coefficient data generated in step (a) and the quantification coefficient data whose amplitude has been reduced in step (d) in accordance with the comparison result in step (f); and (h)coding the quantification coefficient data selected in step (g) into a variable-length code in accordance with the prescribed rule.

In one embodiment of the invention, the statistical characteristics of the quantification coefficient data is related to at least one of the amplitude of the quantification coefficient data, the degree of the quantification coefficient data, and the quantification step.

In another embodiment of the invention, the step (c) includes the step of: judging whether at least one of the condition that the degree of the quantification coefficient data is smaller than a prescribed value and the condition that the amplitude of the quantification coefficient data is larger than the predetermined number is satisfied.

In another embodiment of the invention, the step (c) includes the step of: judging whether at least one of the condition that the degree of the quantification coefficient data is larger than a prescribed value and the condition that the quantification step is smaller than a prescribed value is satisfied.

Alternatively, a method for compression-coding image data includes the steps of: (a)generating a frequency transform coefficient based on the image data; (b)multiplying a quantification step by a value which is greater than 0 and smaller than 0.5 so as to obtain a shift amount; (c)reducing the amplitude of the frequency transform coefficient by the shift amount; (d)quantifying the frequency transform coefficient whose amplitude has been reduced in step (c) in accordance with the quantification step so as to generate quantification coefficient data; and (e)coding the quantification coefficient data into a variable-length code.

In one embodiment of the invention, the value is a fixed value.

In another embodiment of the invention, the value varies depending on the degree of the frequency transform coefficient.

In another embodiment of the invention, the value varies depending on the quantification step.

Thus, the invention described herein makes possible the advantages of providing an image compression-coding apparatus and method for improving the coding efficiency and thus enhancing the image quality after decoding.

These and other advantages of the present invention will become apparent to those skilled in the art upon reading and understanding the following detailed description with reference to the accompanying figures.

According to an image compression-coding apparatus and method of the present invention, the coding efficiency is improved and thus the image quality is enhanced after decoding while the apparatus remains compatible with conventional systems.

BRIEF DESCRIPTION OF THE DRAWINGS

FIG. 2 is a table showing the order of zigzag scan performed by the image compression-coding apparatus shown in FIG. 1;

FIG. 3 is a quantification table defining quantification steps for each of a plurality of transform coefficients used for DCT performed by the image compression-coding apparatus shown in FIG. 1;

FIG. 4 is a view showing a typical example of transform coefficients generated by DCT performed by the image compression-coding apparatus shown in FIG. 1;

FIG. 5 is a view showing an example of quantification coefficient data corresponding to the transform coefficients shown in FIG. 4;

FIG. 6 is a view showing an example of quantification coefficient data output by a level conversion circuit of the image compression-coding apparatus shown in FIG. 1;

FIG. 7 is a view showing an example of quantification coefficient data output by a selection circuit of the image compression-coding apparatus shown in FIG. 1;

FIG. 8 is a view showing an example of a table showing quantification steps defined finely;

FIG. 11 is a view showing an example of quantification coefficient data output by a quantification circuit of the image compression-coding apparatus shown in FIG. 10;

DESCRIPTION OF THE PREFERRED EMBODIMENTS

Hereinafter, the present invention will be described by way of illustrative examples with reference to the accompanying drawings.

EXAMPLE 1

With reference to FIGS. 1 through 9, an image compression-coding apparatus 1 in a first example according to the present invention will be described.

Figure 1:
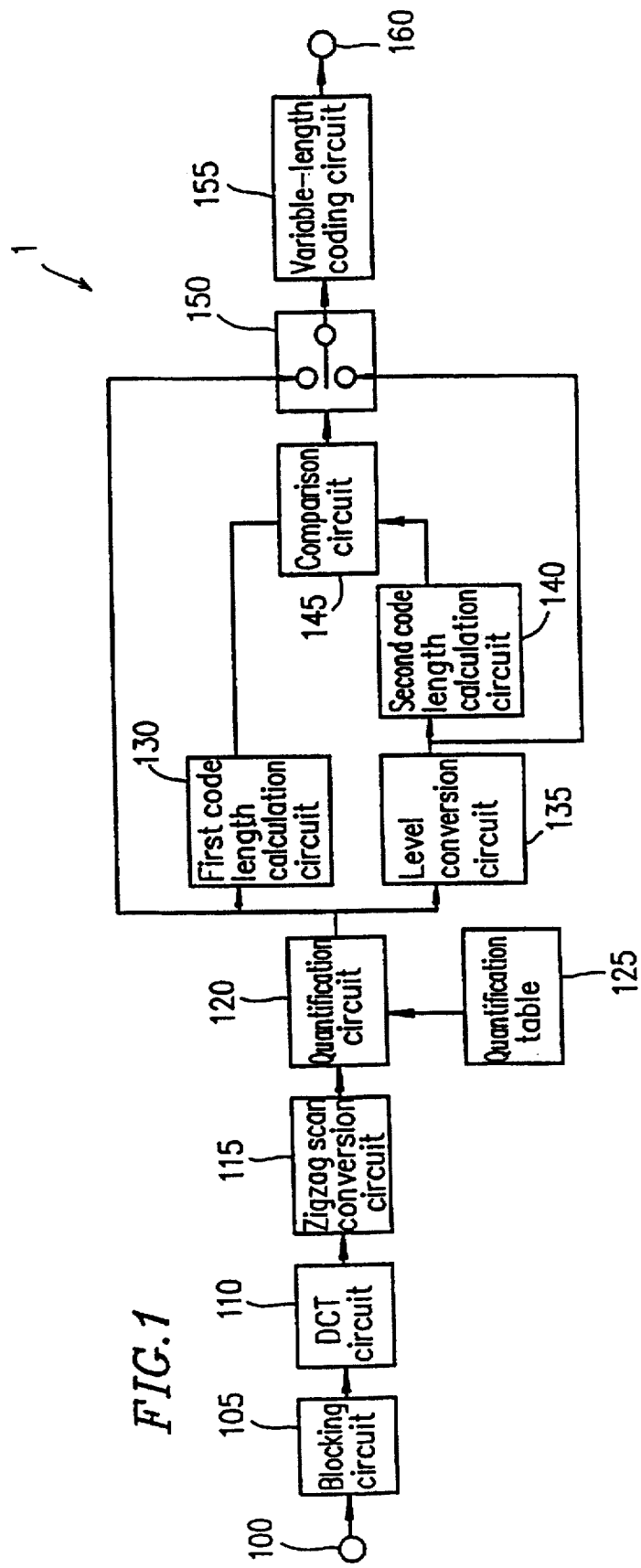
FIG. 1 is a block diagram illustrating a structure of an image compression-coding apparatus in a first example according to the present invention.

FIG. 1 shows a structure of the image compression-coding apparatus 1. The image compression-coding apparatus 1 includes a blocking circuit 105 for dividing image data into a plurality of blocks, a DCT circuit 110 for performing a two-dimensional discrete cosine transform (DCT) for each block and generating a plurality of transform coefficients for each block, a zigzag scan conversion circuit 115 for arranging the transform coefficients in a prescribed order, a quantification circuit 120 for quantifying the transform coefficients arranged in the prescribed order and thus generating a plurality of quantification coefficient data, a first code length calculation circuit 130 for calculating the length of a variable-length code corresponding to the quantification coefficient data, a level conversion circuit 135 for judging whether the amplitude of quantification coefficient data is reduced based on the statistical characteristics of the quantification coefficient data and for reducing the amplitude of the qualification coefficient data by a predetermined number in accordance with the judging result, a second code length calculation circuit 140 for calculating the length of a variable-length code corresponding to the quantification coefficient data output from the level conversion circuit 135, a comparison circuit 145 for comparing the length of the variable-length code calculated by the first code length calculation circuit 130 and the length of the variable-length code calculated by the second code length calculation circuit 140, a selection circuit 150 for selectively outputting one of the output of the quantification circuit 120 and the output of the level conversion circuit 135 in accordance with the comparison result of the comparison circuit 145, and a variable-length coding circuit 155 for coding the output of the selection circuit 150 into a variable-length code.

The image data compression-coding apparatus 1 having the above-described structure operates in the following manner.

Image data is input into the image data compression-coding apparatus 1 through a terminal 100. The image data is then divided into a plurality of 8×8 blocks by the blocking circuit 105. The plurality of 8×8 blocks are each transformed into 8×8 (=64) transform coefficients by the DCT circuit 110. The transform coefficients are arranged by the zigzag scan conversion circuit 115 in a prescribed order, for example, in accordance with the order shown in FIG. 2. The transform coefficients arranged in the prescribed order are quantified by the quantification circuit 120. The quantification of the transform coefficients is performed by dividing each transform coefficient by a corresponding quantification value, which is, for example, shown in FIG. 3. The quantification values are previously stored in a quantification table 125. As a result of the quantification, quantification coefficient data are output by the quantification circuit 120.

The first code length calculation circuit 130 calculates the length of a variable-length code which will be obtained if the quantification coefficient data output from the quantification circuit 120 is coded into a variable-length code in accordance with a prescribed rule. The prescribed rule is the same as the one used by the variable-length coding circuit 155. For example, when a variable-length code output by the variable-length coding circuit 155 includes a two-dimensional Huffman code and additional bit(s), the first code length calculation circuit 130 calculates the sum of the length of the two-dimensional Huffman code and the length of the additional bit(s). Such a sum is obtained by referring to Tables 1 and 2-1 to 2-4 in response to the Run-Level of the quantification coefficient data.

The level conversion circuit 135 judges whether the amplitude of quantification coefficient data is reduced based on the statistical characteristics of the quantification coefficient data for each of the plurality of quantification coefficient data. When it is judged that the amplitude of the quantification coefficient data be reduced, the level conversion circuit 135 reduces the amplitude of the quantification coefficient data by a predetermined number. The predetermined number may be 1, for example. In some cases, there may be no quantification coefficient data whose amplitude to be reduced. In other cases, there may be at least one quantification coefficient data whose amplitude to be reduced. For example, the level conversion circuit 135 reduces the amplitude of the quantification coefficient data by 1, excluding the quantification coefficient data having a zigzag scan number of 7 or later and having an amplitude of 1 or less. As a result, the amplitude of each quantification coefficient data is reduced by 1 when at least one of the conditions that (1) the zigzag scan number of the quantification coefficient data is smaller than 7 and that (2) the amplitude of the quantification coefficient data is greater than 1 is satisfied. The quantification coefficient data whose amplitude is selectively reduced by the level conversion circuit 135 are output to the second code length calculation circuit 140.

The second code length calculation circuit 140 calculates the length of a variable-length code which will be obtained if the quantification coefficient data output from the level conversion circuit 135 is coded into a variable-length code in accordance with a prescribed rule. The prescribed rule is the same as the one used by the variable-length coding circuit 155. For example, when a variable-length code output from the variable-length coding circuit 155 includes a two-dimensional Huffman code and additional bit(s), the second code length calculation circuit 140 calculates the sum of the length of the two-dimensional Huffman code and the length of the additional bit(s). Such a sum is obtained by referring to Tables 1 and 2-1 to 2-4 in response to the Run-Level of the quantification coefficient data.

The comparison circuit 145 compares the length of the variable-length code calculated by the first code length calculation circuit 130 and the length of the variable-length code calculated by the second code length calculation circuit 140. The comparison circuit 145 outputs logic-0 to the selection circuit 150, when the length of the variable-length code calculated by the second code length calculation circuit 140 is shorter than the length of the variable-length code calculated by the first code length calculation circuit 130, and outputs logic-1, otherwise.

The selection circuit 150 selectively outputs one of the output of the quantification circuit 120 and the output of the level conversion circuit 135 in accordance with the comparison result of the comparison circuit 145. When the output of the comparison circuit 145 is logic-1, the quantification coefficient data output from the quantification circuit 120 is selected by the selection circuit 150, and is output to the variable-length coding circuit 155. When the output of the comparison circuit 145 is logic-0, the quantification coefficient data output from the level conversion circuit 135 (i.e. the quantification coefficient data after the level conversion) is selected by the selection circuit 150, and is output to the variable-length coding circuit 155. The variable-length coding circuit 155 outputs a variable-length code corresponding to the quantification coefficient data to an output terminal 160.

Hereinafter, the characteristics of the image data compression-coding apparatus 1 will be described, compared with the characteristics of the conventional image data compression-coding apparatus.

FIG. 4 illustrates, in a matrix form, a typical example of 64 transform coefficients output from the DCT circuit 110. These transform coefficients are sequentially output from the zigzag scan conversion circuit 115 in accordance with the increasing order of the zigzag scan number shown in FIG. 2.

FIG. 5 illustrates, in a matrix form, 64 quantification coefficient data obtained by quantifying the transform coefficients shown in FIG. 4 in accordance with the quantification table shown in FIG. 3. The quantification coefficient data shown in FIG. 5 are output from the quantification circuit 120. Herein, a transform coefficient located at i-row, j-column in the matrix of FIG. 4 corresponds to the quantification coefficient data located at i-row, j-column in the matrix of FIG. 5, where i=1, 2, . . . 8; and j=1, 2, . . . 8.

FIG. 6 illustrates, in a matrix form, 64 quantification coefficient data obtained by the level conversion of the quantification coefficient data shown in FIG. 5. The data indicated in the shaded boxes in FIG. 6 have an amplitude which has been reduced by 1 as a result of the level conversion. Among such data, the data surrounded by the thick lines will be coded into a shortened code by the variable-length coding circuit 155. The quantification coefficient data shown in FIG. 6 are output from the level conversion circuit 135. Herein, the quantification coefficient data located at i-row, j-column in the matrix of FIG. 5 corresponds to the quantification coefficient data located at i-row, j-column in the matrix of FIG. 6, where i=1, 2, ... 8; and j=1, 2, ... 8.

The comparison circuit 145 compares the quantification coefficient data shown in FIG. 5 and the quantification coefficient data shown in FIG. 6 for each element in the matrix. The comparison circuit 145 outputs logic-0 for the quantification coefficient data surrounded by the thick lines in FIG. 6. As a result, the selection circuit 150 outputs the quantification coefficient data after the level conversion. The comparison circuit 145 outputs logic-1 for the quantification coefficient data other than the quantification coefficient data surrounded by the thick lines in FIG. 6. As a result, the selection circuit 150 outputs the quantification coefficient data before the level conversion.

FIG. 7 shows, in a matrix form, 64 quantification coefficient data output from the selection circuit 150. By applying variable-length coding to the quantification coefficient data shown in FIG. 7 in accordance with Tables 1 and 2-1 to 2-4, a 91-bit variable-length code is generated. On the other hand, by applying variable-length coding to the quantification coefficient data shown in FIG. 5 in accordance with Tables 1 and 2-1 to 2-4, a 102-bit variable-length code is generated. This means that the image compression-coding apparatus 1 reduces the amount of codes by 11 (=102-91) bits, compared with the conventional image compression-coding apparatus. This is an example of reducing the length of a variable-length code by the image compression-coding apparatus 1 according to the present invention.

In the image compression-coding apparatus 1, the amplitude of quantification coefficient data is selectively reduced by 1. This means that a quantification error is increased compared with the conventional image compression-coding apparatus in which the amplitude of the quantification coefficient data is not reduced by 1. If such an increased quantification error is concentrated only in a lower frequency band or a higher frequency band, the image quality is possibly degraded.

In order to avoid a concentration of quantification error in a lower frequency band or a higher frequency band, the image compression-coding apparatus 1 adopts an adaptive level conversion based on the statistical characteristics of the quantification coefficient data. By such level conversion, the coding efficiency can be improved while maintaining the visual characteristics obtained by the inherent quantification error.

Hereinafter, the adaptive level conversion based on the statistical characteristics of the quantification coefficient data will be described in detail. The statistical characteristics of the quantification coefficient data are as follows:

1. In the lower frequency band, the quantification coefficient data is likely to have a large amplitude. This is because the energy level is high and the quantification steps are finer in the lower frequency band.

2. In the higher frequency band, the quantification coefficient data is likely to have a small amplitude (0, ±1), and as the frequency is higher, "0" is generated more frequently. This is because the energy level is low and the quantification steps are coarser in the higher frequency band.

An increase in the quantification error corresponding to quantification coefficient data having a specified degree is represented by the product of the quantification step corresponding to the quantification coefficient data having the specified degree and the frequency at which the quantification coefficient data is generated. Accordingly, as the specified degree of the quantification coefficient data increases, namely, as the frequency becomes higher, an increase in the quantification error which is generated by the level conversion of the quantification coefficient data having a small amplitude becomes larger.

As described above, the level conversion circuit 135 in the image compression-coding apparatus 1 in accordance with the first example does not perform level conversion of a quantification coefficient data having a zigzag scan number 7 or later and having an amplitude of 1 or less, but outputs such quantification coefficient data as it is. Thus, when a quantification coefficient data has a small amplitude (0, ±1) in a higher frequency band, the level conversion of the quantification coefficient data is not performed. The quantification coefficient data having an amplitude of 1 is generated frequently in a higher frequency band. Accordingly, an increase in the quantification error for the quantification coefficient data having an amplitude of 1 can be avoided by the level conversion. As a result, an increase in the quantification error is prevented from concentrating in a higher frequency band.

In a lower frequency band, since the quantification steps are finely defined, an increase in the quantification error generated by the level conversion of the quantification coefficient data is relatively small. The increase is further restricted to a minimum possible level by outputting a variable-length code only for the quantification coefficient data which is coded into a code by the variable-length coding circuit 155 which will be shortened as a result of the level conversion.

According to the image compression-coding apparatus 1, a variable-length code having smaller amount of codes can be output as a result of the level conversion compared with the conventional image compression-coding apparatus. As a result, the coding efficiency is improved. Further, by adaptively performing the level conversion based on the statistic characteristics of the quantification coefficient data, the concentration of the increase in the quantification error in a higher or a lower frequency band can be avoided. As a result, visual characteristics obtained by the inherent quantification error can be maintained.

It is assumed that the image compression-coding apparatus 1 according to the present invention is adjusted so as to output the same amount of variable-length codes as the conventional image compression-coding apparatus. In this case, the quantification steps for the image compression-coding apparatus 1 can be defined more finely, compared with the conventional image compression-coding apparatus. This results in the improvement of the image quality.

FIG. 8 is an example of another quantification table. In this quantification table, each quantification step is adjusted so that the quantification coefficient data shown in FIG. 7 can be coded into a 102-bit variable-length code as in the conventional image compression-coding apparatus. As is apparent from a comparison between FIGS. 8 and 3, the quantification steps in FIG. 8 are defined more finely than those in FIG. 3. By compression-coding the image data by the image compression-coding apparatus 1 with reference to the quantification table in FIG. 8, the image quality becomes higher than the image quality obtained by the conventional image compression-coding apparatus with reference to the quantification table in FIG. 3.

By adaptively performing level conversion in accordance with the degree and the amplitude of the quantification coefficient data, the coding efficiency can be enhanced so as to improve the image quality while maintaining the visual characteristics obtained by the inherent quantification error.

In the first example, the length of the variable-length code corresponding to quantification coefficient data is obtained in accordance with the Run-Level of the quantification coefficient data. In the case where the comparison between the lengths of the variable-length codes for a Zero-Run can be made only by comparing the corresponding Levels, the structure of the image compression-coding apparatus can be simplified. The variable-length code system used for the JPEG International Standards is one example of an apparatus having such a simpler structure.

Figure 9:
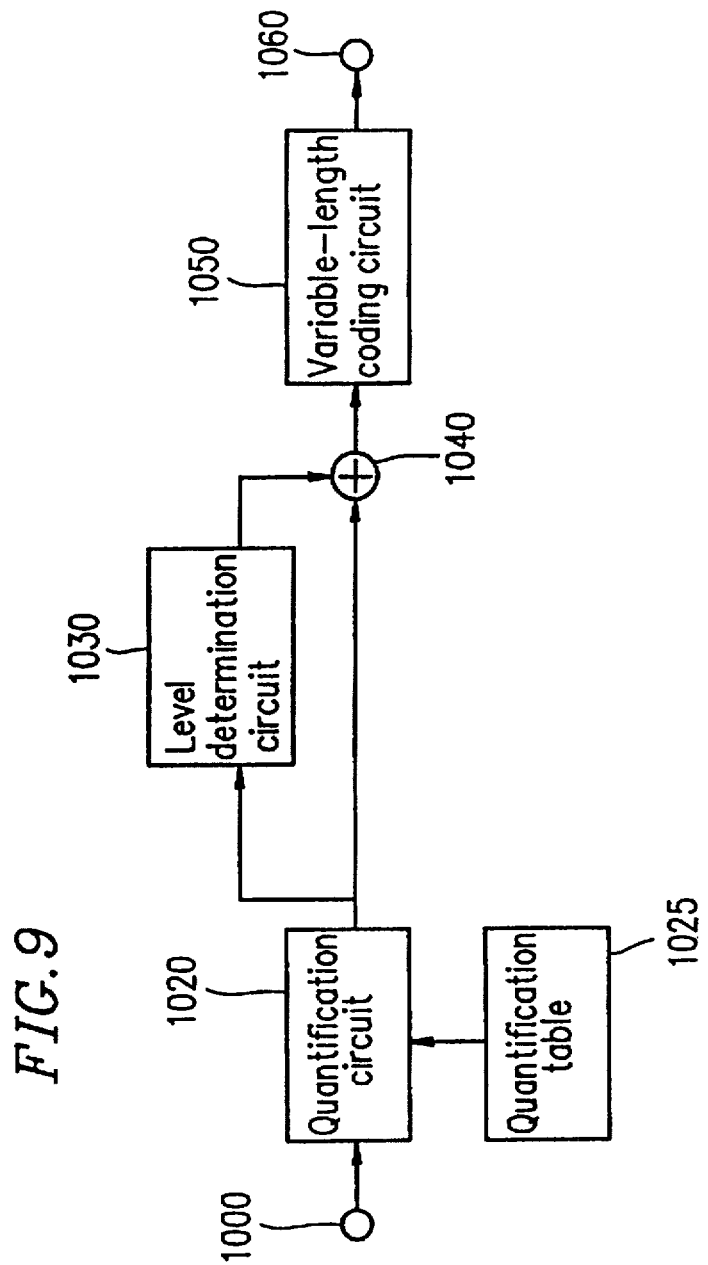
FIG. 9 is a block diagram illustrating another structure of an image compression-coding apparatus in the first example according to the present invention.

FIG. 9 shows another structure of an image compression-coding apparatus in accordance with the first example. A quantification circuit 1020, a quantification table 1025, and a variable-length coding circuit 1050 in FIG. 9 respectively have the same structures as the quantification circuit 120, the quantification table 125, and the variable-length coding circuit 155. To the terminal 1000, substantially the same data as the data output by the zigzag scan conversion circuit 115 (FIG. 1) is input.

The quantification coefficient data output from the quantification circuit 1020 is input to a level determination circuit 1030. When the zigzag scan number for the quantification coefficient data is 7 or larger and the amplitude of the quantification coefficient data is 1 or less, or when the quantification coefficient data is different from the quantification coefficient data having a minimum amplitude in the corresponding group in Table 1, the level determination circuit 1030 outputs 0. Otherwise, the level determination circuit 1030 outputs −1 when the quantification coefficient data is positive and outputs 1 when the quantification coefficient data is negative. The output of the level determination circuit 1030 is added to the quantification coefficient data by an additional circuit 1040 and then coded into a variable-length code by the variable-length coding circuit 1050.

In the case where the comparison between the lengths of variable-length codes for a Zero-Run can be made only by comparing the corresponding levels as described above, the first code length calculation circuit 130, the level conversion circuit 135, the second code length calculation circuit 140, the comparison circuit 145, and the selection circuit 150 as shown in FIG. 1 may be replaced with the level determination circuit 1030 and the addition circuit 1040 as shown in FIG. 9. The image compression-coding apparatus shown in FIG. 9 performs the same processing as the image compression-coding apparatus 1 shown in FIG. 1.

In the above examples, when quantification coefficient data has a zigzag scan number of 7 or larger and an amplitude of 1 or less, the level conversion of the quantification coefficient data is not performed. However, the present invention is not limited to such a specific condition. For example, for a lower bit-rate coding, it may be set so that, when quantification coefficient data has a zigzag scan number of 7 to 48 and an amplitude of 1 or less, the level conversion of the quantification coefficient data is not performed. In this case, the Zero-Run of the quantification coefficient data having a zigzag scan number of 49 or larger is longer, and thus the coding efficiency is further enhanced. Since the quantification coefficient data having a zigzag scan number of 49 or larger are mostly 0, a quantification coefficient data requiring level conversion is not generated frequently. For this reason, an increase in the quantification error of such quantification coefficient data is restricted, and thus the visual characteristics obtained by the inherent quantification error can be well maintained.

In the above examples, the level conversion is performed regardless of the quantification step corresponding to the quantification coefficient data. However, the present invention is not limited to such a specific level conversion. For example, it may be set so that, when the quantification coefficient data has a degree equal to or lower than a prescribed level and quantification steps of 16 or more, the level conversion of the quantification coefficient data is not performed. In this case, deterioration in the image quality is further restricted because a larger quantification error is easily detected in a lower frequency band and thus the detection significantly damages the image quality. By restricting the level conversion in accordance with the number of the quantification steps, deterioration in the image quality can be well restricted.

The variable-lengths code obtained by image compression-coding apparatuses in the above examples and the following examples are all decoded by an apparatus having an identical structure with the conventional image data decoding apparatus 12 mentioned above, and the description thereof will be omitted.

EXAMPLE 2

Figure 10:
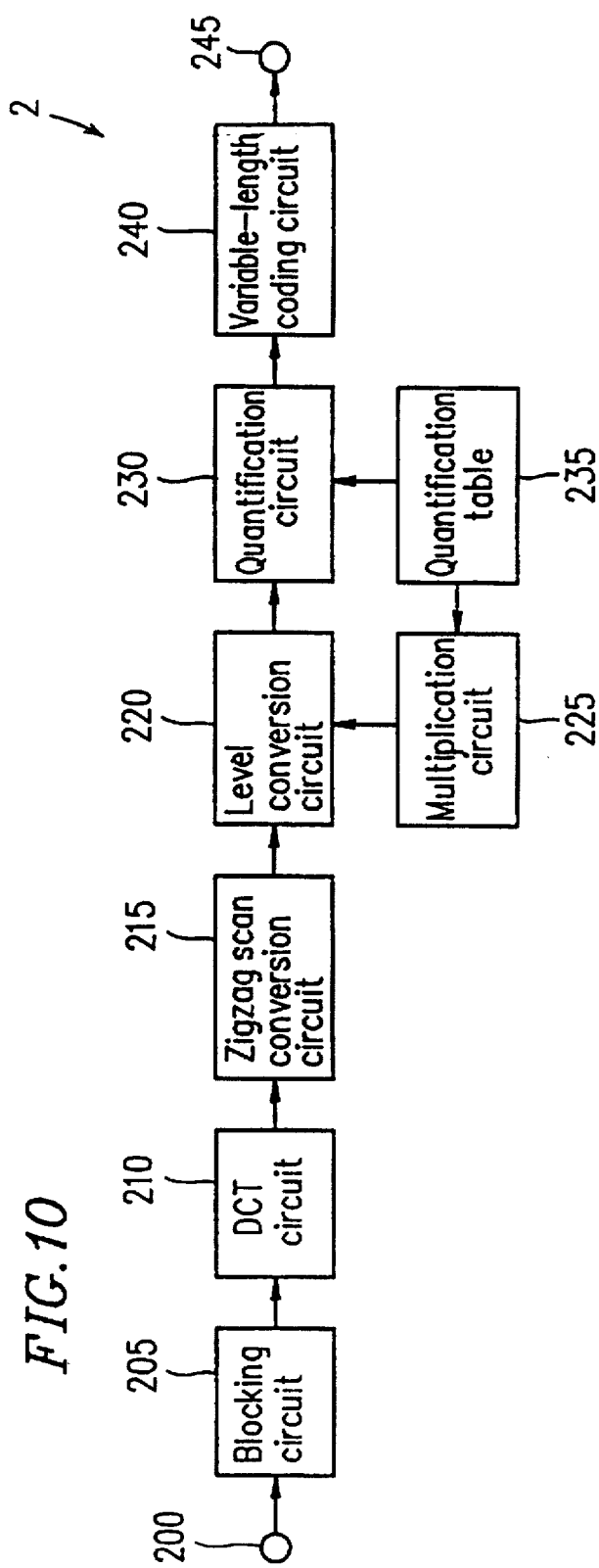
FIG. 10 is a block diagram illustrating a structure of an image compression-coding apparatus in a second example according to the present invention.
Figure 12:
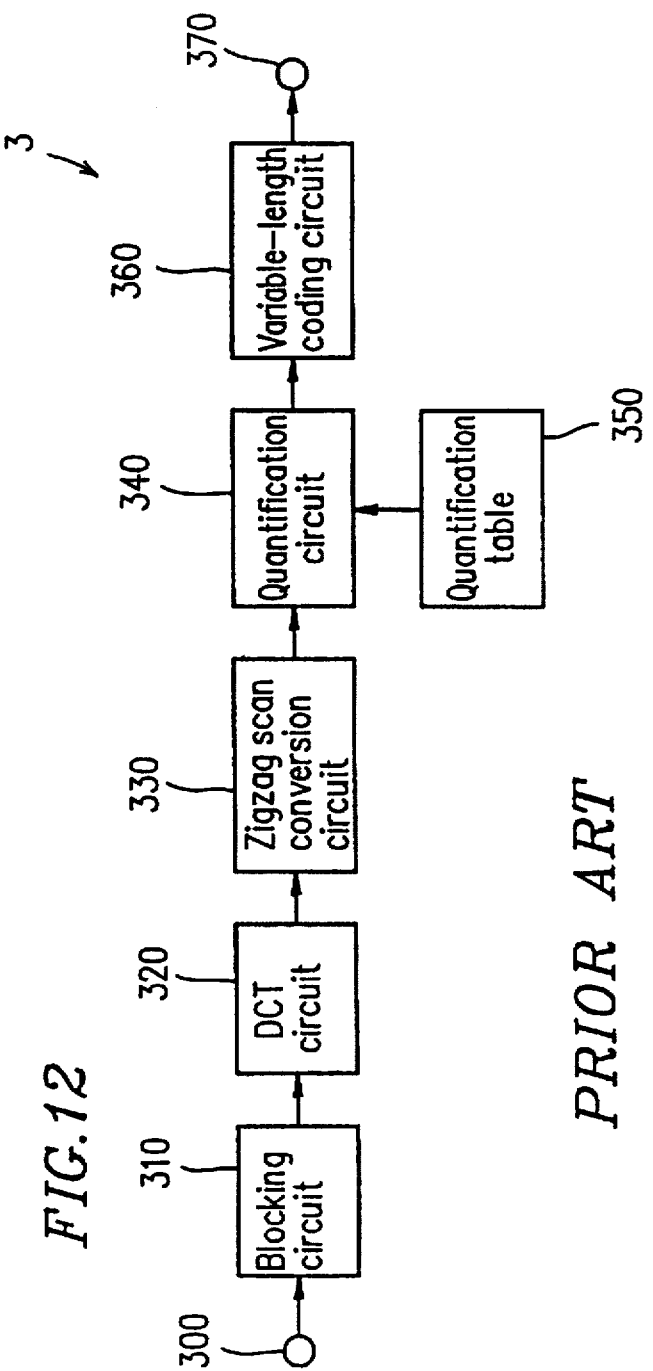
FIG. 12 is a block diagram illustrating a structure of a conventional image compression-coding apparatus.
Figure 13:
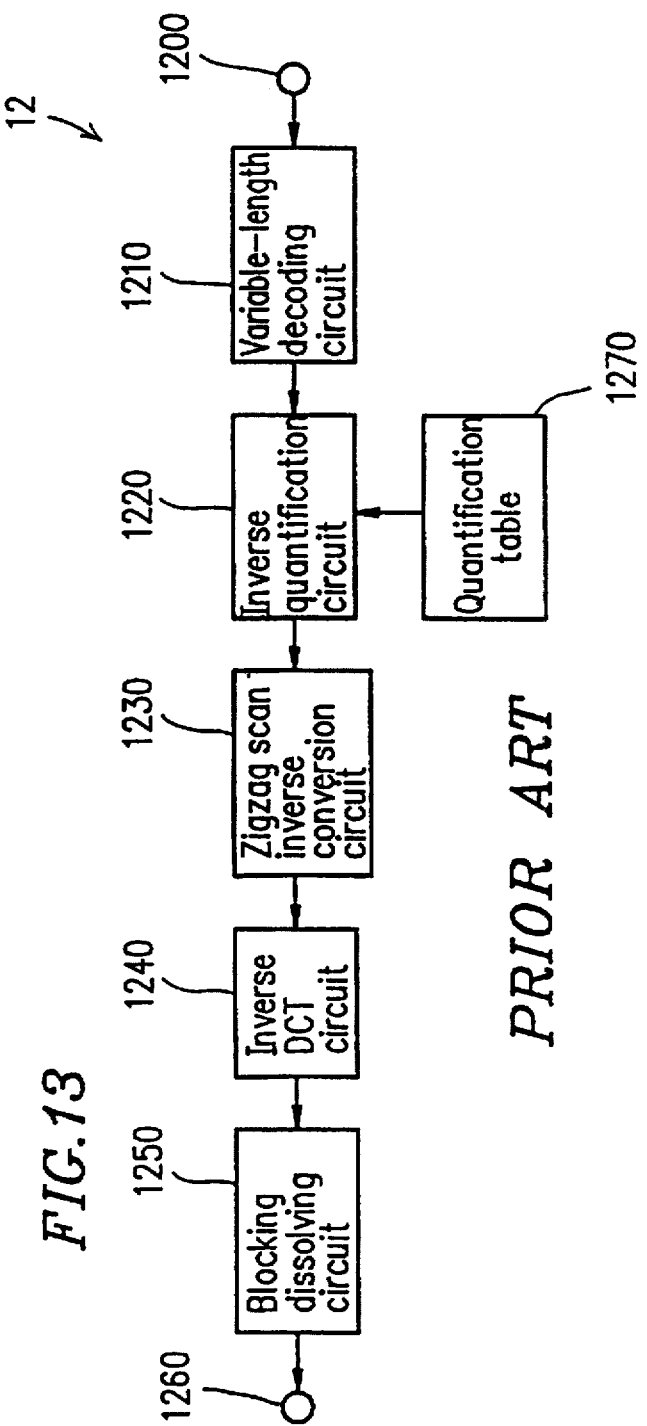
FIG. 13 is a block diagram illustrating a structure of a conventional image data decoding apparatus.

With reference to FIGS. 10 and 11, an image compression-coding apparatus 2 in a second example according to the present invention will be described.

FIG. 10 shows a structure of the image compression-coding apparatus 2. The image compression-coding apparatus 2 includes a blocking circuit 205 for dividing image data into a plurality of blocks, a DCT circuit 210 for performing DCT for each of the blocks and thus generating a plurality of transform coefficients, a zigzag scan conversion circuit 215 for arranging the transform coefficients in a prescribed order, a multiplication circuit 225 for obtaining a shift amount by multiplying the quantification step by a value which is greater than 0 and smaller than 0.5, a level conversion circuit 220 for reducing the amplitude of each of the transform coefficients by the shift amount, a quantification circuit 230 for quantifying the output of the level conversion circuit 220 in accordance with a quantification step and thus outputting quantification coefficient data, and a variable-length coding circuit 240 for coding the quantification coefficient data into a variable-length code. The quantification steps are previously stored in quantification table 235.

The image compression-coding apparatus 2 having the above-described structure operates in the following manner.

Image data is input into the image compression-coding apparatus 2 through a terminal 200. The image data is then divided into a plurality of 8×8 blocks by the blocking circuit 205. The plurality of 8×8 blocks are each transformed into 8×8 (=64) transform coefficients by the DCT circuit 210. The transform coefficients are then arranged in a prescribed order by the zigzag scan conversion circuit 215.

The multiplication circuit 225 obtains a shift amount by multiplying the quantification step stored in the quantification table 235 by a value which is greater than 0 and smaller than 0.5. As the quantification table 235, the quantification table shown in FIG. 3 may be used. Hereinafter, it is assumed that the value which is greater than 0 and smaller than 0.5 is a fixed value of 0.25 in view of convenience for explanation.

The level conversion circuit 220 reduces the amplitude of each transform coefficient by the shift amount. The output of the level conversion circuit 220 is quantified by the quantification circuit 230 in accordance with the quantification table 235. As a result, the quantification coefficient data are output from the quantification circuit 230 to the variable-length coding circuit 240. The variable-length coding circuit 240 codes the quantification coefficient data into a variable-length code and outputs the variable-length code through an output terminal 245.

Hereinafter, the characteristics of the image data compression-coding apparatus 2 according to the present invention will be described, compared with the conventional image data compression-coding apparatus.

FIG. 4 illustrates, in a matrix form, a typical example of 64 transform coefficients output from the DCT circuit 210. These transform coefficients are sequentially output by the zigzag scan conversion circuit 215 in accordance with the increasing order of the zigzag scan number shown in FIG. 2.

FIG. 11 illustrates, in a matrix form, 64 quantification coefficient data obtained by reducing the amplitude of transform coefficients by a shift amount and quantifying such transform coefficients in accordance with the quantification table shown in FIG. 3. The shift amount is obtained by multiplying the corresponding quantification step shown in FIG. 3 by 0.25. The quantification coefficient data shown in FIG. 11 are output from the quantification circuit 230. Herein, a transform coefficient located at i-row, j-column in the matrix of FIG. 4 corresponds to the quantification coefficient data located at i-row, j-column in the matrix of FIG. 11, where i=1, 2, ... 8; and j=1, 2, ... 8.

The quantifaction coefficient data shown in the dotted boxes in FIG. 11 have an amplitude which is reduced as the result of the level conversion. As is apparent from FIG. 11, a smaller level and a longer Zero-Run than those in the conventional image compression-coding apparatus are generated. Accordingly, the length of a variable-length code in the image compression-coding apparatus 2 is shorter than that in conventional apparatus.

Next, a quantification error generated by the level conversion will be described. Conventionally, the quantification error is within the extent of (the quantification step×0.5) at the maximum. In the image compression-coding apparatus 2 according to the present invention, the quantification error is within the extent of (the quantification step×0.75) at the maximum. In other words, the quantification error for the quantification coefficient data whose amplitude is reduced is increased by (quantification step×0.25), compared with the case of conventional apparatus.

However, as a result of the level conversion, the image compression-coding apparatus 2 outputs a variable-length code having a smaller amount of codes, compared with conventional apparatus. It is assumed that the image compression-coding apparatus 2 outputs the same amount of variable-length codes as the conventional apparatus. In this case, the quantification steps of the image compression-coding apparatus 2 can be defined more finely, compared with the conventional apparatus. This results in the improvement of the image quality.

In the second example, the shift amount is obtained by multiplying the quantification step by a fixed value of 0.25 regardless of the degree of the transform coefficient. However, the present invention is not limited to such a specific value. The value by which the quantification step multiplies may vary depending on the degree of the transform coefficient. For example, for lower-bit coding, the shift amount may be obtained by multiplying the quantification step by a larger value as the degree of the transform coefficient increases. In this case, a longer Zero-Run can be obtained, and thus the coding efficiency can be significantly enhanced.

The value by which the quantification step multiplies may vary depending on the quantification step. For example, when the quantification step for a quantification coefficient data is 16 or more in a lower frequency band, the shift amount may be obtained by multiplying the quantification step by 0.1. In this case, the generation of a quantification error can be restricted in the lower frequency band, and thus the image quality is improved.

In the first and the second examples, image data is transformed using DCT. The same effects can be obtained by using LOT, Hadamard transform, or Wavelet transform instead of DCT.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for compression-coding image data, comprising:

frequency transform means for frequency transforming the image data so as to generate a frequency transform coefficient;

quantification means for quantifying the frequency transform coefficient in accordance with a quantification step so as to generate quantification coefficient data;

first code length calculation means for calculating the length of a first variable-length code which will be obtained by coding the quantification coefficient data generated by the quantification means into a variable-length code in accordance with a prescribed rule;

level conversion means for judging whether the amplitude of the quantification coefficient data generated by the quantification means is reduced based on statistical characteristics of the quantification coefficient data and for reducing the amplitude of the quantification coefficient data by a predetermined number in accordance with the judging result;

second code length calculation means for calculating the length of a second variable-length code which will be obtained by coding the quantification coefficient data whose amplitude has been reduced by the level conversion means into a variable-length code in accordance with the prescribed rule;

comparison means for comparing the length of the first variable-length code with the length of the second variable-length code;

selection means for selectively outputting one of the output of the quantification means and the output of the level conversion means in accordance with the comparison result by the comparison means; and coding means for coding the output of the selection means into a variable-length code in accordance with the prescribed rule.

2. An apparatus according to claim 1, wherein the statistical characteristics of the quantification coefficient data is related to at least one of the amplitude of the quantification coefficient data, the degree of the quantification coefficient data, and the quantification step.

3. An apparatus according to claim 1, wherein the level conversion means reduces the amplitude of the quantification coefficient data by the predetermined number, when at least one of the conditions that the degree of the quantification coefficient data is smaller than a prescribed value and the condition that the amplitude of the quantification coefficient data is larger than the predetermined number is satisfied.

4. An apparatus according to claim 1, wherein the level conversion means reduces the amplitude of the quantification coefficient data by the predetermined number, when at least one of the conditions that the degree of the quantification coefficient data is larger than a prescribed value and the condition that the quantification step is smaller than a prescribed value is satisfied.

5. An apparatus for compression-coding image data, comprising:

frequency transform means for frequency transforming the image data so as to generate a frequency transform coefficient;

multiplication means for multiplying a quantification step by a value which is greater than 0 and smaller than 0.5 so as to obtain a shift amount;

level conversion means for reducing the amplitude of the frequency transform coefficient by the shift amount;

quantification means for quantifying the frequency transform coefficient output from the level conversion means in accordance with the quantification step so as to generate quantification coefficient data; and coding means for coding the quantification coefficient data into a variable-length code.

6. An apparatus according to claim 5, wherein the value is a fixed value.

7. An apparatus according to claim 5, wherein the value varies depending on the degree of the frequency transform coefficient.

8. An apparatus according to claim 5, wherein the value varies depending on the quantification step.

9. A method for compression-coding image data, comprising the steps of:

(a) generating quantification coefficient data based on the image data;

(b) calculating the length of a first variable-length code which will be obtained by coding the quantification coefficient data generated in step (a) into a variable-length code in accordance with a prescribed rule;

(c) judging whether the amplitude of the quantification coefficient data generated in step (a) is reduced based on statistical characteristics of the quantification coefficient data;

(d) reducing the amplitude of the quantification coefficient data by a predetermined number in accordance with the judgement result in step (c);

(e) calculating the length of a second variable-length code which will be obtained by coding the quantification coefficient data whose amplitude is reduced in step (d) into a variable-length code in accordance with the prescribed rule;

(f) comparing the length of the first variable-length code with the length of the second variable-length code;

(g) selecting one of the quantification coefficient data generated in step (a) and the quantification coefficient data whose amplitude has been reduced in step (d) in accordance with the comparison result in step (f); and (h) coding the quantification coefficient data selected in step (g) into a variable-length code in accordance with the prescribed rule.

10. A method according to claim 9, wherein the statistical characteristics of the quantification coefficient data is related to at least one of the amplitude of the quantification coefficient data, the degree of the quantification coefficient data, and the quantification step.

11. A method according to claim 9, wherein the step (c) comprises the step of:

judging whether at least one of the condition that the degree of the quantification coefficient data is smaller than a prescribed value and the condition that the amplitude of the quantification coefficient data is larger than the predetermined number is satisfied.

12. A method according to claim 9, wherein the step (c) comprises the step of:

judging whether at least one of the condition that the degree of the quantification coefficient data is larger than a prescribed value and the condition that the quantification step is smaller than a prescribed value is satisfied.

13. A method for compression-coding image data, comprising the steps of:

(a) generating a frequency transform coefficient based on the image data;

(b) multiplying a quantification step by a value which is greater than 0 and smaller than 0.5 so as to obtain a shift amount;

(c) reducing the amplitude of the frequency transform coefficient by the shift amount;

(d) quantifying the frequency transform coefficient whose amplitude has been reduced in step (c) in accordance with the quantification step so as to generate quantification coefficient data; and (e) coding the quantification coefficient data into a variable-length code.

14. A method according to claim 13, wherein the value is a fixed value.

15. A method according to claim 13, wherein the value varies depending on the degree of the frequency transform coefficient.

16. A method according to claim 13, wherein the value varies depending on the quantification step.

* * * * *